United States Patent
Krahling

[11] Patent Number: 5,511,915
[45] Date of Patent: Apr. 30, 1996

[54] FIXTURE FOR RETROFITTING AND WIRING SECURITY ALARM DOOR JAMB SWITCHES TO SECURITY SYSTEMS

[76] Inventor: Joseph D. Krahling, 8113 Arundel Dr., Ft. Washington, Md. 20744

[21] Appl. No.: 206,852

[22] Filed: Mar. 7, 1994

[51] Int. Cl.⁶ .................................................. B23B 49/02
[52] U.S. Cl. ........................ 409/143; 408/79; 408/72 B; 408/115 R; 408/241 B; 409/175
[58] Field of Search ............................ 408/54, 79, 72 B, 408/115 B, 115 R, 241 B, 85, 20, 97; 409/143, 175, 178

[56] References Cited

U.S. PATENT DOCUMENTS

| | | | |
|---|---|---|---|
| 2,193,764 | 3/1940 | Joos | 408/54 |
| 4,447,176 | 5/1984 | Blough et al. | 408/72 R |

FOREIGN PATENT DOCUMENTS

| | | | |
|---|---|---|---|
| 2715340 | 10/1978 | Germany | 408/115 R |
| 705747 | 10/1987 | U.S.S.R. | 408/241 B |
| 2063730 | 6/1981 | United Kingdom | 408/241 B |

Primary Examiner—Daniel W. Howell
Attorney, Agent, or Firm—Laurence R. Brown

[57] ABSTRACT

An installation method for security switches located in door jambs and connection into security system wiring is provided together with a mounting fixture for simplifying the installation. To avoid wall damage, with cylindrically packaged security switches inserted snugly in a hole drilled part way through a door jamb a few inches from the floor, an installation fixture holding a drill at an angle is inserted into the switch mounting hole for drilling at a desired angle a system wire passageway hole into the switch mounting hole wall to extending downwardly through the floor. Another drill held in the fixture at a different angle permits routing of the mounting hole wall form a wire transit channel axially adjacent to an inserted switch for passing the system wires back to connect with the security switch. Thus, after drilling a switch mounting hole, the fixture is inserted thereinto and a wire passageway hole is drilled at a downwardly slanting angle through the floor for connection thereunder into a security control system. Then the fixture, which comprises a cylindrical barrel that abuts the switch mounting hole with a stud extending from each barrel end for entering the switch mounting hole, is reversed using the other stud for inserting a routing drill at a different angle to rout out a wiring channel from the wire passageway entrance backward to the rear of the security switch.

1 Claim, 2 Drawing Sheets

FIXTURE FOR RETROFITTING AND WIRING SECURITY ALARM DOOR JAMB SWITCHES TO SECURITY SYSTEMS

TECHNICAL FIELD

This invention relates to installation of switches for security systems that signal opening of doors to a central alarm system, and more particularly it relates to fixtures and installation method for retrofitting door jamb switches with interior wiring directed inside finished walls.

BACKGROUND ART

When it is necessary to retrofit security alarm systems into finished housing it poses a significant problem to install and wire sensing switches located in a door jamb to a central alarm system, generally located in the basement. The wiring must extend from the door jamb switch and pass though a route inside finished walls to reach the central alarm system in the basement. Wiring visible on exterior wall surfaces is neither acceptable cosmetically nor for security reasons that require the wiring to be hidden from view. Thus, it has been necessary to remove or damage and refinish sidewall surfaces in order to drill holes through interior wall studs when installing such systems in the prior art.

It is accordingly an objective of this invention to resolve the aforesaid problems by simplifying installation of security switches and accompanying wiring in a manner that avoids damage to sidewalls or their removal in the security system installation process.

DISCLOSURE OF THE INVENTION

Accordingly this invention provides the retrofit method of friction fitting a generally cylindrical collared security switch assembly in a snugly fitting shallow switch mounting hole, typically ¾ inch, drilled part way through a door jamb from a position about four inches off the floor. The switch is connected inside that switch mounting hole to system wiring located inside finished sidewalls. In order to expedite the system wiring, a hole is drilled in the circumferential wall of the switch mounting hole to extend downwardly at an angle that passes through the floor into the basement (or crawl space) at a spot near the door jamb. The wiring part of an underfloor system wired into a central security control system is thus connected to the door jamb switch without having to remove sidewalls.

For forming this connecting wire passageway, a small diameter, typically ¼ inch, angled wiring hole is drilled from the inner circumferential surface of the switch mounting hole to pass through the floor near the door jamb. This raises two problems which are solved by means of a drilling fixture, namely (1) the difficulty of starting a hole in a precise location at a proper depth inside the switch mounting hole while the drill bit is held at an angle, and (2) the problem of extending and connecting system wires to the switch without damage by binding or breaking in the switch mounting hole that preferably is a shallow hole that does not pass through the door jamb stud and keeps the switch snugly in place in a friction fit within the switch mounting hole.

To assure that the wiring passageway hole is accurately and neatly drilled, a generally cylindrical drill jig, typically of steel and about six inches long, is provided. An intermediate cylinder of greater diameter, typically one inch, may then abut the switch mounting hole (of ¾ inch diameter) so that a pair of nearly ¾ inch diameter extending cylindrical studs at each end will fit snugly into the switch mounting hole. Thus by inserting one end stud, a drill is positioned outside the stud wall into an angled drill bit guide hole drilled through the fixture from the intermediate cylinder barrel at the desired angle toward and through the sidewall of a first stud end cylinder. This permits a ¼ inch drill bit to pass through the stud cylinder thus to enter the switch mounting hole near the door jamb surface and extend away from the door jamb surface at an acute angle downwardly through the floor. A hole is thus surely and accurately drilled through the jamb and floor for entry of the system wiring pair to be attached to the security switch. As the drilling angle away from the jamb surface becomes greater then the drilled path through the floor is longer and presents more difficulty in threading thin cable wires through the small rough surface hole drilled in the wood. The fixture assures optimum sloping of the wiring downwardly through the floor.

Another problem solved by the fixture is its function in making a wiring channel in the circumferential wall of the switch mounting hole directed axially alongside the switch body for passing the system wires alongside the cylindrical switch body toward the rear end electrical connection point. Thus, the wires do not become wedged in place to encourage breaking of connections to the system, but are easily extended rearly with the entry of the security switch after connection with system wires entering the switch mounting hole from the wire passageway drilled through the floor into the basement. Accordingly a second stud end is provided on the fixture into which a further angled drill guide hole is made, in this case for a ⅜ inch diameter drill. This accommodates a routing drill to extend out near the end of that second fixture stud at a larger angle from the door jamb surface than the drill hole in the first stud end of the fixture. Thus a drill directed through this second stud end reaches into the switch mounting hole back to the rear of the switch, where the wiring connections are made. The routing tool then provides an axial channel alongside and extending to the rear of the switch, thereby permitting the wires to move into position axially alongside the switch body without binding or breaking as the switch is inserted. Thus, the switch may be inserted after connection to the security system wiring coming up from the basement into the switch mounting hole. In this routing step, the stud is axially moved inwardly and outwardly while drilling with the drill tip extending a short distance into the circumferential wall of the switch mounting hole to form the channel for the wiring that extends from the wire entrance hole to the rear of the installed switch.

Other objects, features and advantages of the invention will be found throughout the following description, claims and accompanying drawings.

THE PREFERRED EMBODIMENT

Now the invention is described with reference to the accompanying drawings. The improved installation method for security switches and accompanying wiring is particularly advantageous for retrofitting into existing dwellings without damage or alteration to sidewall structure while feeding security system wiring from the installed switches inside the walls to a central control system generally located underfloor in the basement or crawl space. Thus, security system wiring from the switches is passed inside walls and through floors to connect with a central security control system without requiring removal of or damage to existing sidewall surfaces.

Figure 1:
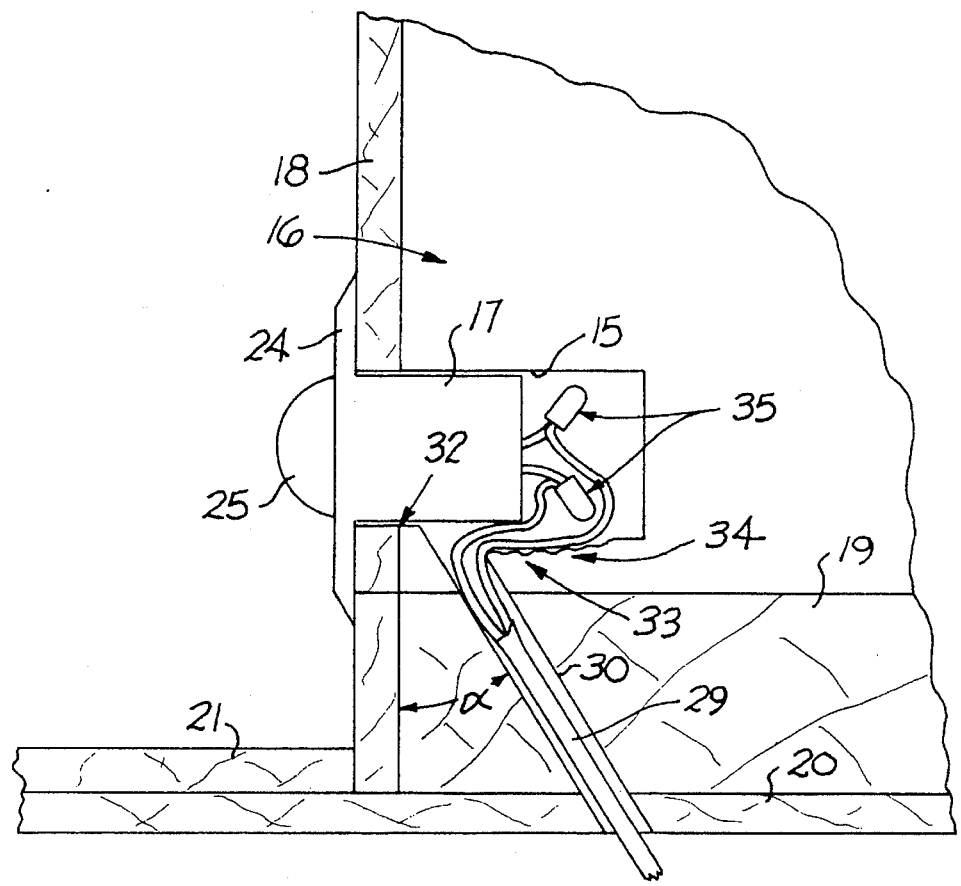
FIG. 1 is a fragmental side view sketch, partly in section of a security switch mounted in a door jamb and connected to security system wiring.

As may be seen from FIG. 1, in the first installation step a security switch mounting hole 15, typically of a ¾ inch diameter, is drilled into and partly through the door jamb 14 and inner two by four stud 16 for snugly fitting a switch body 17 of cylindrical shape thereinto a predetermined distance from a door jamb surface 18. The mounting hole 15 is located close to the floor, typically five inches, just above an inner wall support two by four 19 resting on the flooring 20 on which the door threshold 21 rests. The switch 17 has a shoulder 24 abutting the jamb surface 18 and the roller ball switch plunger 25 actuates the switch when the accompanying door (not shown) is opened to give a security alarm.

To connect the security switch 17 by means of connectors 35 into the security system, a cable or wiring pair 29 passes through the floor 20 into a basement or crawl space where a system control unit is located. In accordance with this invention a slanted wire passageway hole 30 is disposed at an acute angle α (30°) from the jamb wall surface 18. There is a problem in drilling the wire passageway hole 30 through the inner wall of the switch mounting hole 15 in maintaining an appropriate angular orientation and in starting the hole at a known fixed position inside the switch mounting hole 15 with an ordinary drill. While drill guides are known for holding drills for entry at an angle to a workpiece, as for example, in U.S. Pat. Nos. 4,253,784 to R. O. Anderson, or 4,447,176 to L. A. Blough, et al., no suitable prior art fixture is known for use in drilling the wire passageway hole 30.

Furthermore there is the problem in that the wires must be passed from the upper terminal 32 of hole 30 backward axially alongside the body of switch 17 inside mounting hole 15, as shown at 33 when the switch is inserted after wiring into the system. This is resolved by this invention by routing out a channel 34 leading into the rear of the switch mounting hole 15 from the terminal junction 32 of the wire passageway hole 30. This channel 34 extends internally past the rear of switch 17, so that system cable 29, which is connected to switch connectors 35 may be stored without binding or tension in the wires that could cause failure or switch insertion problems. All of this is done without removing or damaging any finished sidewalls. For expediting the switch installation and assuring neatness and avoiding workmanship that could lead to defects in the security system or damage to sidewalls when retrofitting in already completed dwellings is necessary, then this invention provides a novel fixture and mounting method.

Figure 2:
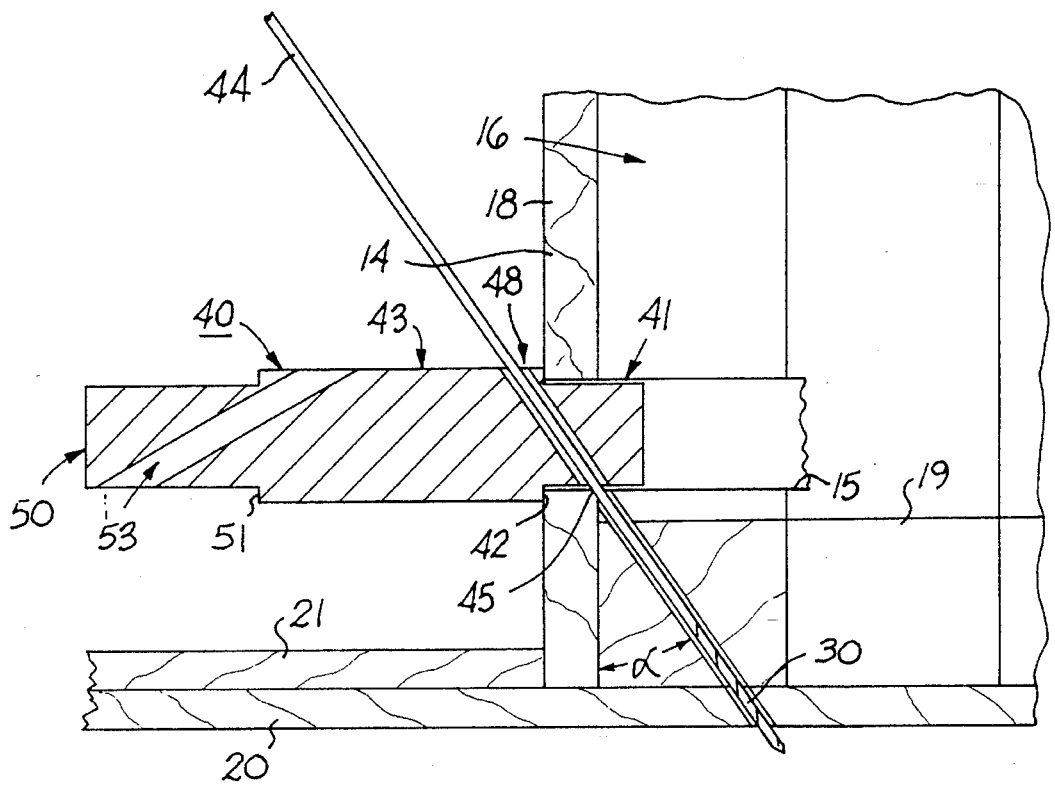
FIG. 2 is a fragmental side view sketch, partly in section, showing a fixture in place in the security switch mounting hole in a door jamb to guide a drill for drilling a wire passageway through the door jamb and floor.
Figure 3:
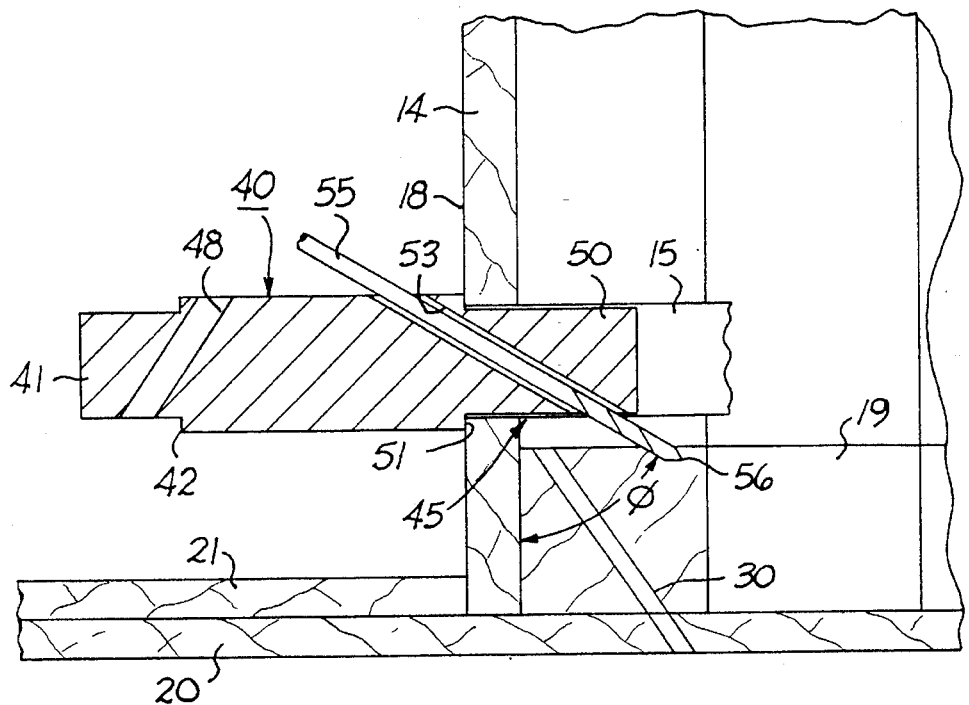
FIG. 3 is a fragmental side view sketch, partly in section, of the fixture in place in the security switch mounting hole into a door jamb for routing out an axial channel in the mounting hole circumferential surface for passing wires.

The barrel shaped fixture 40 provided by this invention is shown in FIG. 2 with a first stud end 41 inserted in the switch mounting hole 15 up to the shoulder 42 separating the stud end 41 from the central cylinder barrel 43. As may be seen, the drill bit 44 is extended through the fixture at an angle for passing a drill through the switch mounting hole surface at 45 inside the jamb facing 18 and from there downwardly through the floor 20.

Thus, in the switch mounting method of this invention, after drilling the switch mounting hole 15, the fixture 43 is inserted at stud end 41 into said switch mounting hole a fixed distance defined by shoulder 42 to guide the drill bit 44 at the proper angle for drilling the wire passageway hole 30. The fixture 43 is of a material such as steel for guiding the drill bit 44 through a surrounding guide hole angled through the fixture, thus holding drill 44 at a known acute angle α to the door jamb surface for extending into said switch mounting hole so that the drill enters through the fixture from a position outside the jamb surface moving downwardly towards a position in the drilling hole circumferential surface. This permits drilling with drill 44 oriented by said fixture a wiring passageway 30 downwardly through the door jamb and through the floor for carrying security system wires (29) to the switch by way of the wiring passageway.

The wires or wiring cable 29 is then extended from the underfloor security control system into the switch mounting hole 15 for connection to the security switch 17 before moving it into its snugly fitting position in the mounting hole 15. For this purpose the channel 34 is gouged or routed out of the switch mounting hole circumferential surface axially alongside switch body 17.

This is done with aid of fixture 43, which at the end opposite to the first stud 41 terminates in the second stud 50 of reduced diameter to produce shoulder 51. This stud provides a further drill guide hole 53 for directing a second drill 55 of greater diameter (⅜ inch) into the switch mounting hole 15 at an angle φ typically 60°, which is greater than the first acute angle α, typically 30°, from the door jamb surface 18. This extends the routing drill bit 56 into said switch mounting hole 15 far enough to engage the lower drilling hole circumferential surface beyond the site of an inner terminal end of a security switch 17 when mounted in the switch mounting hole.

Thus, the drill 55 is used as a routing drill to rout out a wire conveying channel with the drill 55 tip extended through the fixture 40 the second guide hole 53, starting from a position outside the abutting shoulder 51 to reach past the inner end site of the switch 17 when seated in hole 15. Thus, the fixture 40 is withdrawn until the routing tip 56 reaches the terminal 45 of wire passageway 30 to rout the wiring channel 34 alongside the switch body. Thus, the wires 33 extending from junction end 45 of the wiring passageway hole 30 are passed back towards the rear connection end of the switch to pass and rest wires 33 in the groove 34 as shown in FIG. 1.

Figure 4:
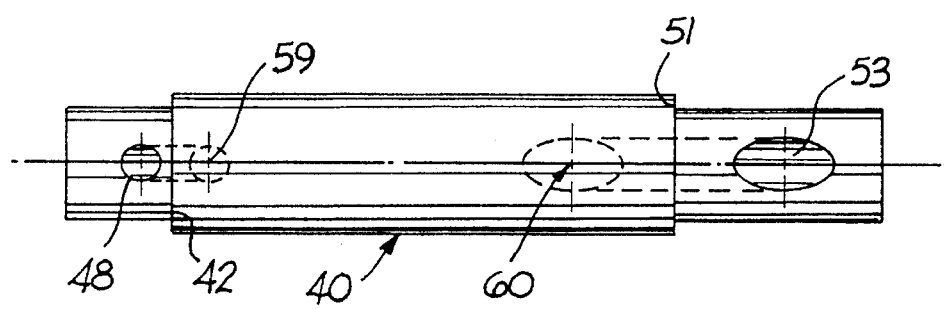
FIG. 4 is a top plan view of the fixture.

The fixture 40 is typically made of a six inch long cylindrical steel rod of one inch diameter having 0.74 inch diameter studs 41, 50 at opposite ends. The stud 41 is typically three-quarter inch long with hole 48 innermost center 59 in the central barrel portion located 1.04 inches from the end. The stud 50 is similarly 0.74 inch in diameter and 1.5 inches long, with the hole 53 innermost center 60 positioned 2.25 inches from the end. The top view of FIG. 4 shows the relative positions of the drill guide holes 48 and 53.

In this preferred embodiment therefore the stud diameters extending from the fixture barrel snugly fit into the switch mounting hole 15 of ¾ inch diameter with shoulders 42, 51 shaped for abutting the door jamb surface for registering the depth of penetration of the studs. It is seen that the guide holes for orienting a drill entering the fixture barrel and extending from the stud at a predetermined acute angle to the door jamb surface direct the drill downwardly into the surface of the mounting hole 15 extending into the door jamb to assure that the holes are properly positioned when working from outside the door jamb surface 18.

The fixture may be made inexpensively of aluminum or a tough plastic material such as "Delrin", which would permit the drilling of fewer holes than steel, but would be suitable for accompanying an installation kit for the security switches.

This invention provides therefore a novel fixture for guiding a routing drill inwardly into a hole drilled into a wall surface for routing out a channel in a surface of the hole extending inwardly from a position inside the wall surface. Thus a fixture body having a stud extending therefrom snugly enters said hole to position a drill guide hole internally in the drilled hole in the wall surface. The drill guide hole extends at an acute angle from said wall surface through said fixture body and stud for holding a drill to extend inside the hole to position a drill outside the hole. This fixture has a shoulder serving as indexing means for establishing an innermost reach of the drill into the hole and permits the fixture to be moved axially out of that position to rout out an axial channel on the inner surface of the hole. Thus, with the fixture and mounting method of this invention security switches may be neatly and accurately mounted with connections to the security control system, while avoiding damage to wiring. The installation method further has the advantage that behind wall wiring does not require removing or damaging side wall panelling so that this method is particularly advantageous for retrofitting in existing dwellings. Therefore having advanced the state of the art, those novel features defining the spirit and nature of the invention are set forth with particularity in the following claims.

I claim:

1. A fixture for use in mounting a security switch in a door jamb mounting hole to extend a switch actuator outwardly from a door jamb surface to sense an open door, and wiring that switch into a security system, comprising in combination:

a fixture barrel with a stud extending therefrom shaped for snugly fitting into the switch mounting hole and a shoulder shaped for abutting the door jamb surface for registering the depth of penetration of the stud, a guide hole for orienting a drill entering the fixture barrel and extending from the stud to hold a drill at a predetermined acute angle to the door jamb surface for directing the drill downwardly into a surface of the mounting hole extending into the door jamb to extend therefrom through underlying flooring, thereby to provide a wire passageway leading from the switch mounting hole and through the flooring to a security control system, a second stud extending from said barrel to fit snugly into the switch mounting hole, and a guide hole for orienting a drill entering the fixture barrel and extending from the stud at a predetermined angle greater than said acute angle to the door jamb surface for directing the drill downwardly at an angle into an inner surface of the mounting hole extending into the door jamb, thereby to provide means for routing a wire passageway channel leading from the switch mounting hole and axially toward the rear of the switch mounting hole so that system connecting wires extending through the wire passageway will pass adjacent to a switch body inserted into the switch mounting hole.

* * * * *